United States Patent

Duff

[11] Patent Number: 6,141,667
[45] Date of Patent: Oct. 31, 2000

[54] WATERPROOFING AND INCREASING PORTABILITY OF A PORTABLE COMPUTER

[76] Inventor: Mark Blaise Duff, Prince Station, Box 39, New York, N.Y. 10012

[21] Appl. No.: 08/273,813

[22] Filed: Jul. 12, 1994

[51] Int. Cl.[7] ............................................. G06F 1/16
[52] U.S. Cl. ............................................. 708/100
[58] Field of Search .................... 364/708.1; 708/100

[56] References Cited

U.S. PATENT DOCUMENTS

| | | | |
|---|---|---|---|
| 4,795,354 | 1/1989 | Owen | 439/137 |
| 4,839,837 | 6/1989 | Chang | 364/708.1 |
| 4,901,261 | 2/1990 | Fuhs | 364/708.1 |
| 4,926,365 | 5/1990 | Hsieh | 364/708.1 |
| 4,969,830 | 11/1990 | Daly et al. | 439/136 |
| 5,021,763 | 6/1991 | Obear | 340/407 |
| 5,023,824 | 6/1991 | Chadima et al. | 364/708.1 |
| 5,026,295 | 6/1991 | Fong et al. | 439/135 |
| 5,096,317 | 3/1992 | Phillippe | 400/714 |
| 5,155,659 | 10/1992 | Kunert | 361/380 |
| 5,175,672 | 12/1992 | Conner et al. | 361/393 |
| 5,199,888 | 4/1993 | Condra et al. | 439/142 |
| 5,205,017 | 4/1993 | Wang | 16/367 |
| 5,224,869 | 7/1993 | Lee | 439/136 |
| 5,333,116 | 7/1994 | Hawkins et al. | 364/708.1 |
| 5,336,848 | 8/1994 | Katz | 364/708.1 |
| 5,341,154 | 8/1994 | Bird | 364/708.1 |

*Primary Examiner*—David H. Malzahn
*Attorney, Agent, or Firm*—Staas & Halsey LLP

[57] ABSTRACT

A portable computer is provided with a clam shell case design, sealed with a sealant, form-fitted sealing units, a detachable handle, a detachable shoulder strap, and a detachable rear housing combination which increase the portability of the computer. The portability of the computer is increased because the clam shell case with sealant, and port sealing units, along with the detachable rear unit, combine for protection of the inside of the computer, including the internal circuitry, the display, keyboard, pointing device (or mouse), power cord, battery pack, extra batteries, and extra diskettes from the weather, increasing portability. The sealant waterproofs the portable computer by being placed between the top housing and the bottom portion of the portable computer, eliminating the need for a separate carrying case to hold the portable computer and to protect the portable computer from the elements. The form-fitted port sealing units protect the ports and the internal circuitry from the elements. The detachable handle and detachable shoulder strap, either singly or in combination, also provide for increasing the portability of the portable computer. In addition, stabilizing strips are attached to the underside of the bottom portion of the portable computer, to maximum adhesion to adverse surfaces.

20 Claims, 5 Drawing Sheets

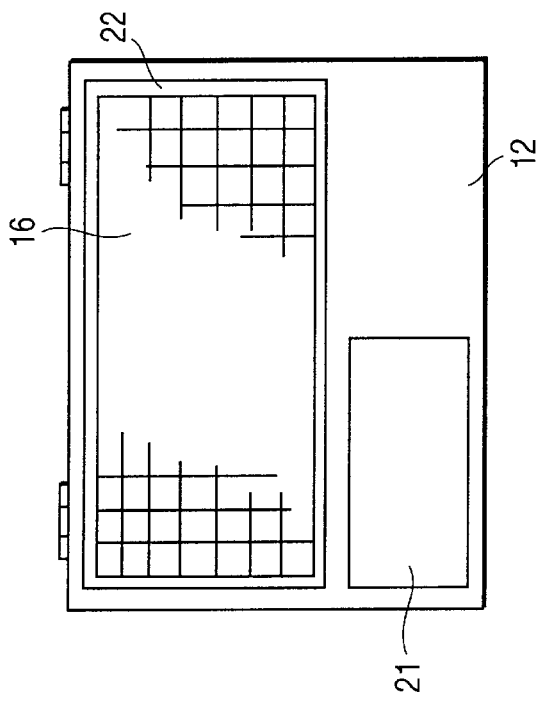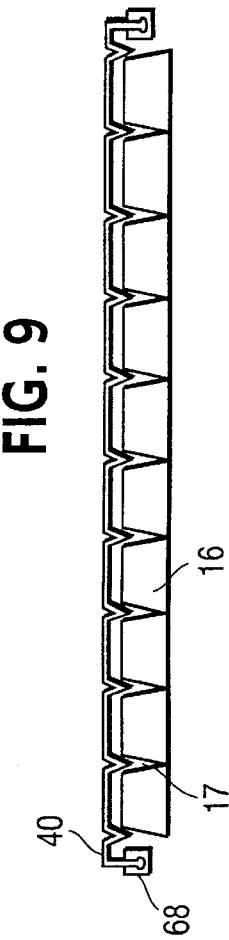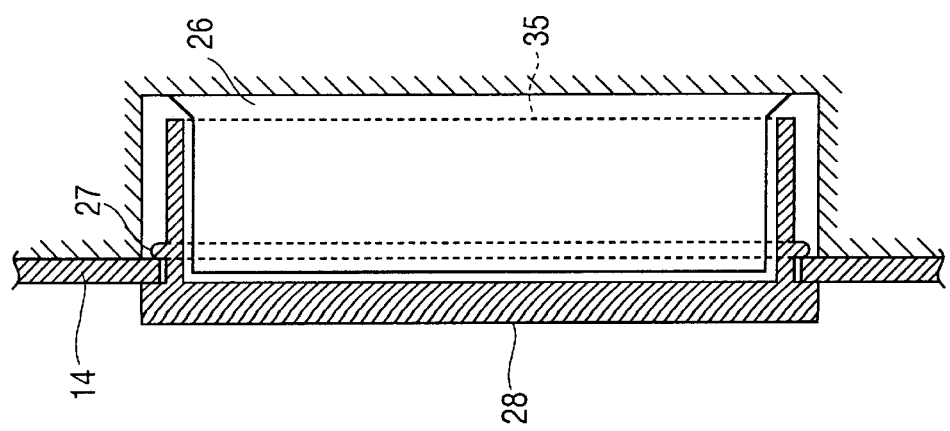

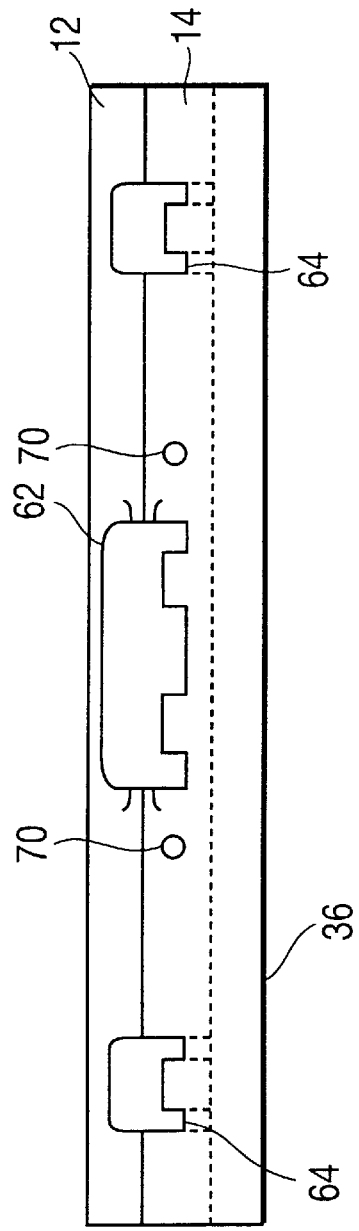
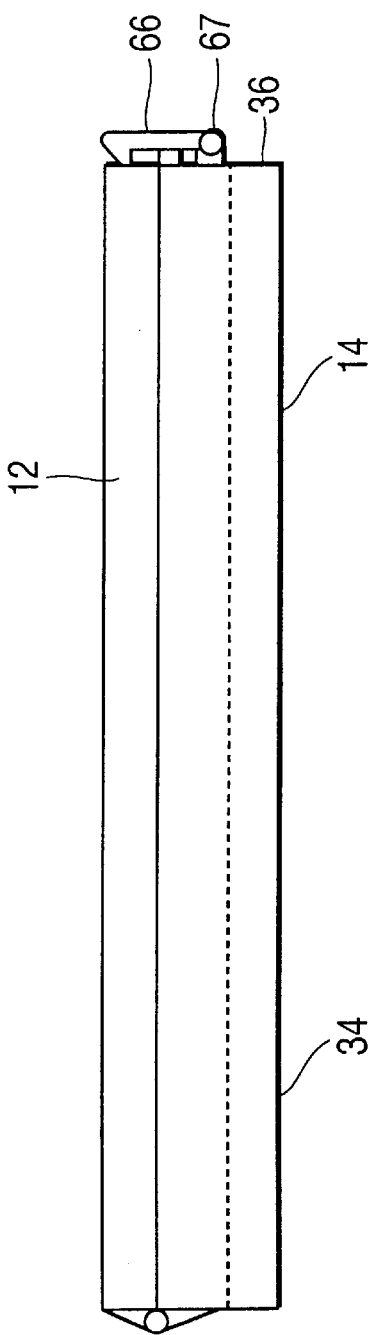

WATERPROOFING AND INCREASING PORTABILITY OF A PORTABLE COMPUTER

BACKGROUND OF THE INVENTION

1. Field of the Invention

This invention relates to waterproofing and ruggedizing portable computers using a sealant placed between separate parts of the portable computer housing when the parts are in a closed position, flexible port sealing units, a detachable handle attached in strategic positions, and a strap attached such that the portable computer swings away from the person carrying it.

2. Description of the Related Art

Portable computers typically are full function personal computers intended for easy transport from one work location to another. A portable computer typically contains a screen, a keyboard, a pointing device such as an internal or external mouse, a battery pack and/or a power cord, and ports through which differing peripheral devices, such as a printer, a CD-ROM, external drives, external monitors, modems, power outlets, phone line jacks, and the like, can be interfaced. Typically, in portable computers, the display screen is placed in a top unit which is connected to a bottom unit housing the keyboard, pointing device such as a mouse, and other devices. When the portable computer is in use, the top cover is typically opened away from the bottom portion. The top cover may be detachable or remains attached to the bottom portion through one end of the top cover. By opening the top cover, the user can typically place the screen in an appropriate viewing position, and input information into the portable computer using the keyboard and the pointing device (mouse). To make the portable computer ready for transport, the top cover is typically closed to connect with the bottom portion, the portable computer power cord is unplugged from the power source, and the peripheral devices are uncoupled from the external ports.

One problem that exists in the prior art is that the interface between the closed top cover and the bottom portion is not waterproof. Another problem in the related art is if the top cover is accidentally removed during transport, the keyboard is then exposed to the elements. A further problem in the related art is that the ports are typically not waterproof. In addition, in the related art, the underside of the bottom portion either sits flush against, or contacts by contact points at each of the corners of the bottom part, a resting surface such as a desk or table top. A further problem of the related art is that the carrying handles attached to the portable computers are typically not made for gripping by a user wearing heavy gloves. Typically, in the related art, safe transport of a portable computer means placing the portable in a separate carrying bag with a shoulder strap.

SUMMARY OF THE INVENTION

The improved housing of the portable computer according to the present invention is characterized by a sealant made from one continuous soft rubber or silicon seal which, when the top cover is closed against the bottom portion, protects the keyboard, battery, screen, pointing device, etc., from damage from the elements. The sealant, in a preferred embodiment, is shaped in the form of a gasket. A replaceable rubber microfilm covers the keyboard to protect the keys from brief exposure to the elements if the top cover opens unexpectedly.

The present invention also includes flexible port sealing units that are molded to the specifications of the ports to be form-fitted to each individual port, and that are attached to the portable computer housing by a rubber or nylon string or strip. The portable computer housing of the present invention also includes a detachable shoulder strap that provides for long-distance supporting of the computer that reduces the need to place the portable computer in a extra case, a detachable, waterproof auxiliary rear housing unit that provides space for the power cord and adaptor, an extra battery, and extra diskettes.

The detachable rear housing unit is sealed to the main housing unit using a sealant similar to the sealant used to seal the top cover to the bottom portion. The detachable rear housing unit may be either screwed on tightly or may contain quick releases, for convenient detaching and short distance porting.

The present invention also contains stabilizing strips attached to the underside of the bottom portion to maximum adhesion to adverse surfaces. In addition, in the present invention, a multiple-mounting lightweight plastic handle, which is detachable, with a rubber grip can be attached in various locations to either the short side or the broad side of the computer with either screws or quick releases. The handle provides a large area through which the user may place his or her gloved hand, is durable and thick for easy gripping by a user wearing heavy gloves.

An additional feature of the present invention is that the battery is safely located within the enclosure formed by the top cover and the bottom portion, and is secured in place by a quick release for quick access once the top cover is opened. The top and bottom portions are made of a plastic material that reduce the jarring effect of a hard surface, and render unnecessary the need for a second case for transporting the portable computer. There is also an internal skeleton frame, with rubber or plastic shock absorbers, that decreases the jarring effect of porting the computer, and all of the major components in the computer are fixed to this frame.

BRIEF DESCRIPTION OF THE DRAWINGS

Further details of the invention are explained below with the aid of the attached drawings in which:

FIG. 7 is an enlarged view of the port sealing units of the present invention;

FIG. 8 is a top view of the present invention, showing the placement of the sealant around the keyboard;

FIG. 9 is a side view of the cover placed atop the keyboard;

FIG. 10 is a top view of the portable computer with the top cover closed against the bottom portion, showing a single snap seal and two dual snap seals; and FIG. 11 is a side view of a hinged snap seal.

DESCRIPTION OF THE PREFERRED EMBODIMENT

Figure 1:
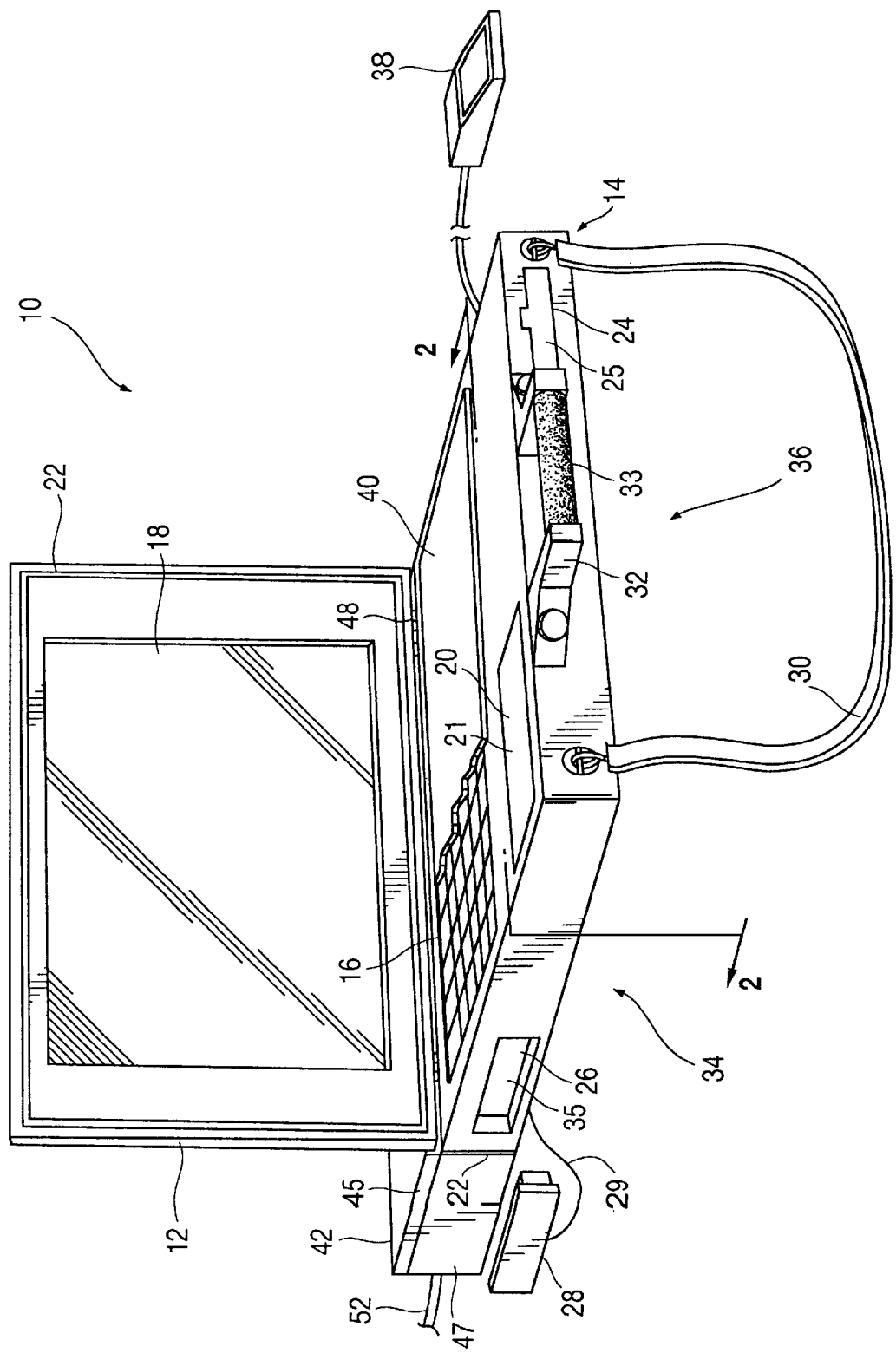
FIG. 1 is a perspective view of the portable computer according to the present invention.

Referring now to FIG. 1, a portable computer 10 in accordance with the present invention includes a clam shell case divided into a top cover 12 and a bottom portion 14, and includes a keyboard 16, a display 18, a battery pack 20, a battery pack cover 21, a sealant 22, a diskette drive 24, an example of a port 26, a jack 35, and a port sealing unit 28, a strap 30, a multiple mounting handle 32, a short side 34, a broad side 36, a pointing device (or mouse) 38, a replaceable rubber microfilm 40, and a rear housing unit 42. The bottom portion 14 is one solid piece, in a preferred embodiment. In an alternate embodiment, the bottom portion 14 could be further divided into an upper portion and a lower portion. Although a sealant 22 is shown attached to the top cover 12, the sealant 22, in an alternate embodiment, could be attached to the bottom portion 14. The sealant 22, in a preferred embodiment, is in the form of a gasket, being hollow in the middle to decrease weight, and is made of rubber tubing. In alternate embodiments, the sealant 22 is made from silicon, or other waterproof and malleable material. In further alternate embodiments, the sealant 22 is solid.

In FIG. 1, the display 18 resides in the top cover 12, which is attached to the bottom portion 14 through hinges 48. The bottom portion 14 contains one or more ports 26, a battery pack 20 with a battery pack cover 21, a keyboard 16, a pointing device 38, and a diskette drive 24. In an alternate embodiment, the lower portion of the bottom portion 14 is removable for easy access to internal circuitry (not shown) of the portable computer 10. If the bottom portion 14 is divided into an upper portion 44 and a lower portion 46, the upper portion 44 and the lower portion 46 are sealed with the sealant 22. The optional rear housing unit 42 of the present invention, is shown attached to the bottom portion 14.

FIG. 1 depicts the portable computer 10 of the present invention in an operating condition. When the portable computer 10 is to be transported, the top cover 12 is closed against the bottom portion 14. The sealant 22 is trapped between the top cover 12 and the bottom portion 14, and runs continuously therebetween. In addition, the ports 26 are sealed with port sealing units 28, which are attached to the portable computer 10 by strips 29 and which form fit within the ports 26 and the jack 35. Prior to closing the top cover 12 against the bottom portion 14, a replaceable rubber microfilm 40 is placed over the keyboard 16, to provide extra protection to the keyboard 16 in case the top cover 12 accidentally opens during transport. Further, the diskette drive 24 is provided with a port sealing unit 28, form-fitted and molded to the diskette drive 24.

FIG. 1 also shows the battery pack 20, placed on the same surface of the bottom portion 14 as the keyboard 16. By positioning the battery pack 20 in this manner, when the top cover 12 is closed against the bottom portion 14, the battery pack 20 is protected from water damage by the sealant 22 trapped between the top cover 12 and the bottom portion 14. The battery pack cover 21 allows quick access to the battery pack 20.

An optional rear housing unit 42 is attached to the bottom portion 14. The rear housing unit 42 has a cover 45 and a body 47. The rear housing unit 42 contains space for a power cord 52, space for an extra battery (not shown), and space for extra diskettes (not shown). A sealant 22 is also provide between the rear housing unit 42 and the bottom portion 14 at the interface thereof. The sealant 22 is attached to the rear housing unit 42.

As an alternative, the diskette drive 24 may be placed so that the diskette drive door 25 opens on the same surface of the bottom portion 14 as the keyboard 16, so that the diskette drive door 25, and therefore the diskette drive 24, is fully protected from the elements when the top cover 12 is sealed against the bottom portion 14. The ports 26 can include a printer port, a CD-ROM, external drives, external monitors, modems, power outlets, phone line jacks, etc. The port sealing unit 28 may be made from soft rubber molded to the manufacture-design ports.

When the top cover 12 is closed against the bottom portion 14, the sealant 22 is placed therebetween, protecting the battery pack 20, the keyboard 16, and the display 18 from weather damage by the elements.

FIG. 1 also shows a strap 30 which may be attached to the portable computer 10, and is another feature of the present invention. The strap 30 may be a shoulder strap, and is detachable. The strap 30 provides for long-distance porting of the portable computer 10, and eliminates the need to place the portable computer 10 into a extra casing for transporting. The strap 30 is attached by hinges perpendicular to latches so that the portable computer 10 swings away from the body when being transported.

Another feature of the present invention shown in FIG. 1 is a multiple-mounting plastic handle 32 attached to the broad side 36 of the bottom portion 14. As an alternative, the multiple-mounting plastic handle 32 may be attached to the short side 34 of the bottom portion 14. The multiple-mounting plastic handle 32 has a rubber grip 33. The multiple-mounting plastic handle 32 with rubber grip 33 is detachable, and is durable and thick for easy gripping by a user wearing heavy gloves.

Both the top cover 12 and the bottom portion 14 are made of a reasonably-hard plastic material soft enough to reduce the jarring effect of a harder surface, and further render unnecessary the need for an extra carrying case in which to place the portable computer 10 for transport. Not shown in FIG. 1 is an internal skeleton frame, the object of which is to decrease the jarring effect of porting the portable computer 10, and all of the major components (not shown) are fixed to the internal skeleton frame.

Figure 2:
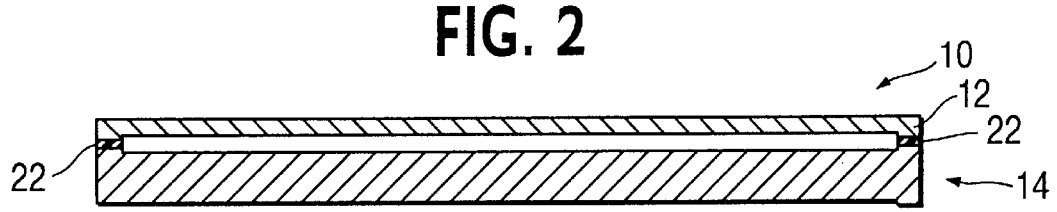
FIG. 2 is cross-sectional view of the portable computer of the present invention, through the top cover and the bottom portion with the top cover closed, showing the contact of the sealants with the top cover and bottom portion of the main housing.

FIG. 2 is a cross section of the portable computer 10 through the top cover 12 and the bottom portion 14, with the top cover 12 closed. FIG. 2 illustrates in detail the locations of the sealant 22 in relation to the top cover 12 and the bottom portion 14.

Figure 3A:
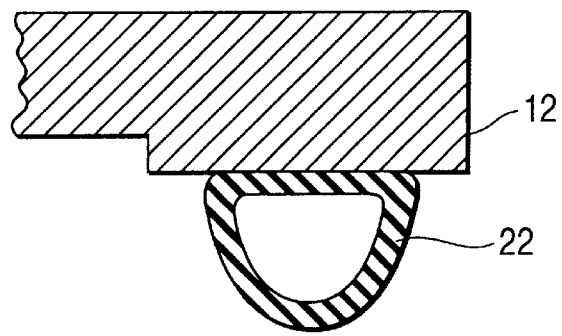
FIG. 3(A) is an enlarged view of the sealant attached to the top cover of the main housing of the present invention.

FIG. 3(A) illustrates the appearance of the sealant 22, when attached to only the top cover 12. In FIG. 3(A), the top cover 12 is in the open position, and the sealant 22 is not being compressed.

Figure 3B:
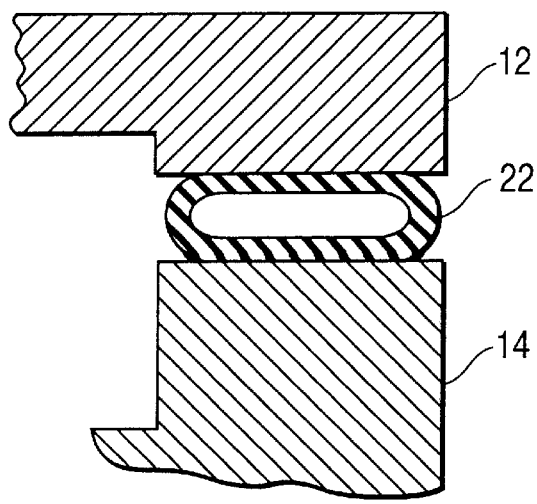
FIG. 3(B) is an enlarged view of the closure between the top cover, the sealant, and the bottom portion of the present invention.

FIG. 3(B) shows the appearance of the sealant 22 when the top cover 12 is closed against the bottom portion 14.

Figure 4:
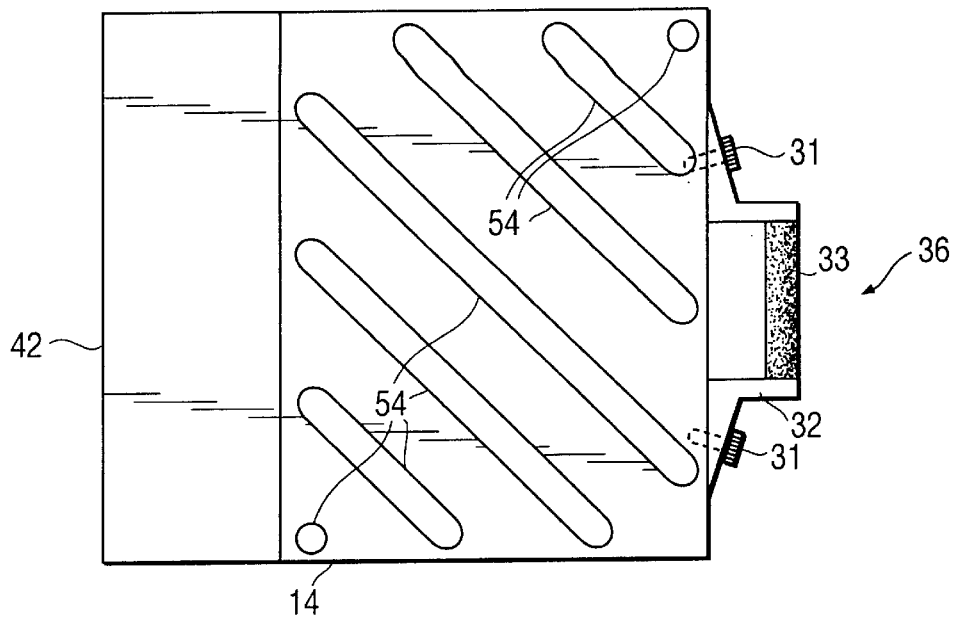
FIG. 4 is a plan view of the under side of the bottom portion of the present invention, including the stabilizing strips and the detachable handle.

FIG. 4 shows the stabilizing strips 54, which are attached on the underside of the bottom portion 14. In a preferred embodiment, the stabilizing strips 54 are glued to the underside of the bottom portion 14. In a preferred embodiment, the stabilizing strips 54 are made of neoprene, but could also be made of other materials such as rubber. The stabilizing strips 54 are intended for use in operating the portable computer on uneven surfaces and in inclement conditions, and run diagonally across the underside of the bottom portion 14 to maximum adhesion to adverse surfaces. The stabilizing strips 54 are attached to the underside of the bottom portion 14 by epoxy. Stabilizing strips 54 are used because a full piece of neoprene or rubber would render the portable computer too heavy, and reduce the portability thereof. FIG. 4 also shows the multiple-mounting plastic handle 32, with the rubber grip 33. The multiple-mounting plastic handle 32 is attached to the broad side 36 with handle attachments 31 or with screws.

Figure 5:
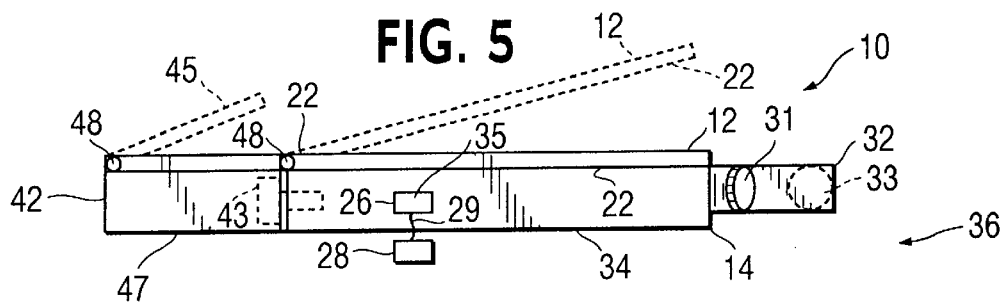
FIG. 5 is a side view of the portable computer of the present invention showing the attachment of the rear housing unit, the attachment of the handle to the front of the bottom portion, and the position of the partial opening of the top cover of the main housing and the cover of the rear housing unit.

In FIG. 5, the rear housing unit 42 is shown attached to the bottom portion 14 via rear housing unit attachments 43. The rear housing unit attachments 43 may be either screws or quick releases. A sealant 22 is placed between the rear housing unit 42 and the bottom portion 14. FIG. 5 also shows a cover 45 for the rear housing unit 42. The cover 45 is attached at one end of the cover 45 to the rear housing unit 42 through hinges 48. A sealant 22 is shown attached to the cover 45, so that when the cover 45 is closed against the rear housing unit 42, the sealant 22 protects the contents of the rear housing unit 42 from the weather, thus providing a waterproof seal.

Further, FIG. 5 shows the top cover 12 depicted in a partially opened position, and indicates that the sealant 22 is attached thereto. A port 26 is shown on the short side 34 of the portable computer 10. The port 26 may be placed on the short side 34 or on the broad side 36. Attached to the port with a strip 29 is a port sealing unit 28. When the portable computer 10 is in transport, the port sealing unit 28 may be placed over the port 26 to provide a waterproof seal of the port 26. The multiple-mounting plastic handle 32, with a rubber grip 33, is shown attached to the broad side 36 through handle attachments 31. Further in FIG. 5, the cover 45 of the rear housing unit 42 is depicted in a partially opened position. The cover 45 is attached to the body 47 by hinges 48. A sealant 22 is shown placed between the rear housing unit 42 and the bottom cover 14.

Figure 6:
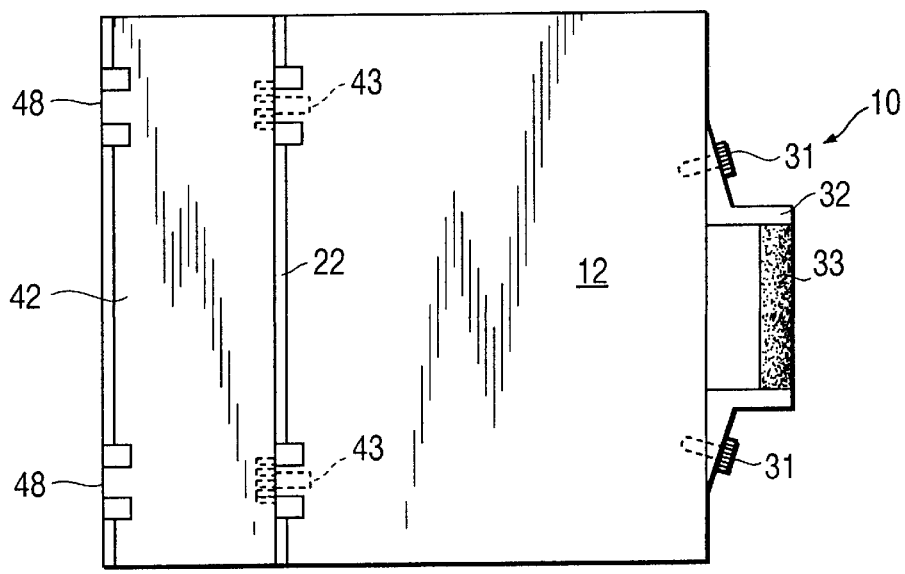
FIG. 6 is top view of the present invention, showing the attachment of the handles and of the rear housing unit to the main housing.

FIG. 6 is a top view of the portable computer 10 showing the top side of the top cover 12, with the multiple-mounting plastic handle 32, and rubber grip 33, attached to the top cover 12 through handle attachments 31. Also attached to the portable computer 10 is the rear housing unit 42. The rear housing unit 42 is attached through the rear housing unit attachments 43, and is separated from the portable computer 10 by the sealant placed therebetween. The hinges 48 for the cover 45 (not shown in FIG. 6) are also illustrated.

FIG. 7 is a detailed view of the port sealing unit 28 placed over the port 26. The port sealing unit 28 is held in place over the port 26 through flanges 27, which extend around the port sealing unit 28. When the port sealing unit 28 is placed over the port 26 and the jack 35, the flanges 27 contact the bottom portion 14 and prevent the port sealing unit 28 from accidentally being removed from the port 26 and provide a second seal. The port sealing unit 28 is form-fitted to the port 26 and to the jack 35, or a portion thereof, within the port 26.

As shown in FIG. 8, the sealant 22 surrounds the keyboard 16, and is placed between the keyboard 16 and the top cover 12. The sealant 22 forms a seal around the keyboard 16 and prevents harmful elements from reaching below the top cover 12.

FIG. 9 shows the placement of the cover 40 over the keyboard 16. In FIG. 9, the keys 17 are completely covered by the replaceable rubber microfilm 40. The replaceable rubber microfilm 40 is locked into place, when the portable computer 10 is not in use, by zip lock seals 68 continuously surrounding the keyboard 16. The zip lock seals 68 hold the replaceable rubber microfilm 40 in place to protect the keys 17 from damage from dust, water, or other harmful elements.

FIG. 10 shows two embodiments of the method for closing the top cover. In the preferred embodiment, 2 dual snap seals 64 are placed near each end of the broad side 36 of the bottom portion 14. When the top cover 12 is closed against the bottom portion 14, the dual snap seals 64 attach to the top cover 12 and hold the top cover 12 in place.

In an alternate embodiment, as shown in FIG. 10, a single snap seal 62 may be placed in the center of the bottom portion 14, between the insertion points 70 for the multiple mounting handle 32. When the top cover 12 is closed against the bottom portion 14, the single snap seal 62 contacts the top cover 12 in the middle of the broad side 36 of the bottom portion 14.

FIG. 11 shows a hinged snap seal 66 placed on the broad side 36 of the bottom portion 14 of the portable computer 10. The hinged snap seal 66 is attached to the broad side 36 by a hinge 67, and contacts the top cover 12 when the top cover 12 is closed against the bottom portion 14. The hinged seal 66 secures the top cover 12 against the bottom portion 14 when the portable computer 10 is not in use.

The present invention is not limited to the embodiments described herein, and variations and modifications may be made without departing from the scope of the invention. Alternate embodiments include, but are not limited to, laptop, transportable, notebook, palmtop computers, and subnotebook computers.

What is claimed is:

1. A portable computer including a keyboard and a display, and comprising:
 a clam shell case comprising:
  hinges;
  a bottom housing comprising a battery pack and an interior surface containing the keyboard;
  a top housing containing the display, one end of said top housing being connected to a corresponding end of said bottom housing by the hinges; and
  a sealant, placed continuously between the bottom housing and the top housing when the top housing is closed against the bottom housing to seal the portable computer, wherein the sealant is malleable and compresses when the top housing is closed against the bottom housing.

2. The portable computer as claimed in claim 1, wherein the bottom housing further comprises an interior surface on which the top housing rests when the top housing is closed against the bottom housing, and an exterior surface on which the portable computer rests when the portable computer is in use, said portable computer further comprising a pointing device wherein said keyboard and said pointing device are located on said interior surface.

3. The portable computer as claimed in claim 1, wherein the sealant is a gasket.

4. The portable computer as claimed in claim 1, wherein the top housing rests on the interior surface when the top housing is closed against the bottom housing, said bottom housing further comprising an exterior surface on which the portable computer rests when the portable computer is in use.

5. The portable computer as claimed in claim 4, further comprising stabilizing strips located on the exterior surface.

6. The portable computer as claimed in claim 1, further comprising:

at least one external port located within the bottom housing; and at least one port sealing unit corresponding to and sealing said at least one external port.

7. The portable computer as claimed in claim 6, further comprising at least one multiple-mounting handle attached to the bottom housing.

8. The portable computer as claimed in claim 7, wherein said bottom housing further comprises an exterior surface on which the portable computer rests when the portable computer is in use, and said portable computer further comprises stabilizing strips located on said exterior surface.

9. The portable computer as claimed in claim 8, further comprising:

a rear housing unit coupled to, and detachable from, the bottom housing; and another sealant, placed continuously between the rear housing unit and the bottom housing.

10. The portable computer as claimed in claim 9, further comprising a strap attached to the bottom housing by perpendicular hinges.

11. The portable computer as claimed in claim 8 wherein the sealant is a gasket.

12. A portable computer having a clam shell case including a keyboard and a display, comprising:

a bottom housing containing the keyboard and at least one external port, said bottom housing comprising an exterior surface on which the portable computer rests when the portable computer is in use;

a top housing connected to the bottom housing and containing the display;

a sealant, placed continuously between the bottom housing and the top housing when the top housing is closed against the bottom housing, to seal the portable computer;

at least one port sealing unit corresponding to and sealing said at least one external port;

at least one multiple-mounting handle attached to the bottom housing;

stabilizing strips located on said exterior surface, a rear housing unit coupled to, and detachable from, the bottom housing;

another sealant, placed continuously between the rear housing unit and the bottom housing;

a strap attached to the bottom housing by perpendicular hinges;

a removable cover covering the keyboard; and zip lock seals attaching the removable cover to the bottom housing.

13. The portable computer as claimed in claim 12, wherein the bottom housing further comprises an interior surface on which the top housing rests when the top housing is closed against the bottom housing, and an exterior surface on which the portable computer rests when the portable computer is in use.

14. The portable computer as claimed in claim 13, wherein said portable computer further comprises a battery pack placed within the interior surface.

15. The portable computer as claimed in claim 12, wherein the at least one external port includes a jack, and the at least one port sealing unit corresponding to the at least one external port is form-fitted to the at least one external port and to the jack.

16. The portable computer as claimed in claim 15, further comprising:

dual snap seals attached to the bottom housing and clamping closed the top housing to the bottom housing if the top housing is closed against the bottom housing and compressing the sealant.

17. The portable computer as claimed in claim 16, wherein the dual snap seals are hinged seals.

18. A method of sealing a portable computer, having a clam shell case including a top housing comprising a display and a bottom housing coupled to the top housing and comprising a keyboard and a battery pack, from weather damage, said method comprising the steps of:

placing a sealant, comprising malleable material, between the top housing and the bottom housing, said sealant establishing a barrier between outside of the clam shell case and inside of the clam shell case if the top housing is closed against the bottom housing, one end of said top housing being connected to a respective end of the bottom housing by hinges; and placing a port sealing unit into a port located in the bottom housing, said port sealing unit being form-fitted to the port.

19. The method according to claim 18, further comprising the step of:

placing another sealant between the clam shell case and a detachable rear housing unit coupled to the clam shell case.

20. A method of sealing a portable computer, having a clam shell case including a top housing comprising a display and a bottom housing coupled to the top housing and comprising a keyboard and a battery pack, from weather damage, said method comprising the steps of:

placing a sealant, comprising malleable material, between the top housing and the bottom housing, said sealant establishing a barrier between outside of the clam shell case and inside of the clam shell case if the top housing is closed against the bottom housing, one end of said top housing being connected to a respective end of the bottom housing by hinges;

placing a port sealing unit into a port located in the bottom housing, said port sealing unit being form-fitted to the port;

attaching a removable cover to the bottom housing using zip-lock seals; and covering the keyboard with the removable cover.

* * * * *